United States Patent
Geyer (10) Patent No.: US 8,567,191 B2
(45) Date of Patent: Oct. 29, 2013

(54) METHODS AND SYSTEMS FOR CONTROLLING TRANSIENT ENGINE RESPONSE

(75) Inventor: Stephen Mark Geyer, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 13/072,057

(22) Filed: Mar. 25, 2011

(65) Prior Publication Data

US 2012/0240909 A1 Sep. 27, 2012

(51) Int. Cl.
| F02B 33/44 | (2006.01) |
| F02B 41/00 | (2006.01) |
| F02B 23/00 | (2006.01) |
| B60K 6/00 | (2007.10) |
| B60K 8/00 | (2006.01) |

(52) U.S. Cl.
USPC .............. 60/611; 60/605.1; 123/26; 123/585; 180/165

(58) Field of Classification Search
USPC .......... 60/611, 605.1; 180/165; 123/432, 585, 123/26, 316
See application file for complete search history.

(56) References Cited

U.S. PATENT DOCUMENTS

| 1,593,571 A * | 7/1926 | Curtis ........................... 60/605.1 |
| 2,983,267 A | 4/1961 | Percival |
| 3,020,901 A * | 2/1962 | Cook ........................ 123/559.1 |
| 3,141,448 A | 7/1964 | Candelise |
| 3,513,929 A | 5/1970 | Kim |
| 4,224,911 A | 9/1980 | Mitsuda et al. |
| 4,240,381 A * | 12/1980 | Lowther ......................... 123/26 |
| 4,424,676 A | 1/1984 | Meiners |
| 4,481,773 A | 11/1984 | Sugito et al. |
| 4,569,318 A | 2/1986 | Fujimura et al. |
| 5,064,423 A | 11/1991 | Lorenz et al. |
| 5,299,547 A | 4/1994 | Michimasa |
| 5,404,852 A | 4/1995 | Frankle |
| 6,223,846 B1 * | 5/2001 | Schechter ..................... 180/165 |
| RE37,269 E | 7/2001 | Yamaguchi et al. |
| 6,427,646 B2 | 8/2002 | Galka et al. |
| 6,484,673 B1 * | 11/2002 | Davis et al. ................... 123/432 |
| 7,231,998 B1 * | 6/2007 | Schechter ..................... 180/165 |
| 7,314,043 B1 * | 1/2008 | Berger et al. ................ 123/585 |
| 7,363,127 B2 * | 4/2008 | Fogelstrom .................... 60/611 |
| 7,665,302 B2 * | 2/2010 | Nemeth et al. .................. 60/611 |
| 7,685,819 B2 * | 3/2010 | Vetrovec ......................... 60/611 |
| 7,762,069 B2 * | 7/2010 | Gerum ............................ 60/611 |
| 7,854,118 B2 * | 12/2010 | Vetrovec ..................... 60/605.1 |
| 7,866,156 B2 * | 1/2011 | Nemeth et al. ............... 60/605.1 |
| 7,926,271 B2 * | 4/2011 | Nemeth et al. ............... 60/605.1 |
| 8,069,665 B2 * | 12/2011 | Pursifull et al. ............... 60/611 |
| 2003/0015185 A1 | 1/2003 | Dutart |

(Continued)

FOREIGN PATENT DOCUMENTS

| EP | 629774 B1 | 12/1994 |
| WO | WO 2009100883 A1 * | 8/2009 |

*Primary Examiner* — Thai Ba Trieu (74) *Attorney, Agent, or Firm* — GE Global Patent Operation; John A. Kramer (57) ABSTRACT

Various methods and systems for operating an internal combustion engine are provided. In one embodiment, an example method for operating an internal combustion engine includes, under a first condition, charging a compressed air storage vessel via a compressor. The method further includes, under a second condition, directly injecting compressed air from the storage vessel to a cylinder of the engine to enhance fuel combustion.

20 Claims, 7 Drawing Sheets

(56) References Cited

U.S. PATENT DOCUMENTS

| | | |
|---|---|---|
| 2004/0025507 A1 | 2/2004 | Leigh et al. |
| 2009/0217898 A1 | 9/2009 | Gokhale et al. |
| 2011/0041496 A1* | 2/2011 | Mayr .............................. 60/611 |
| 2011/0109157 A1* | 5/2011 | Tani ................................ 60/660 |
| 2011/0219766 A1* | 9/2011 | Marx et al. ................... 60/605.1 |
| 2012/0067044 A1* | 3/2012 | Marx et al. ....................... 60/611 |
| 2012/0144826 A1* | 6/2012 | Rebhan et al. ................... 60/611 |
| 2012/0151916 A1* | 6/2012 | Tiwari et al. .................. 60/605.1 |
| 2012/0186249 A1* | 7/2012 | Guzzella et al. ................. 60/612 |
| 2012/0216531 A1* | 8/2012 | Schaffeld et al. ................ 60/611 |
| 2012/0216532 A1* | 8/2012 | Schaffeld et al. ................ 60/611 |
| 2012/0216533 A1* | 8/2012 | Schaffeld et al. ................ 60/611 |

* cited by examiner

METHODS AND SYSTEMS FOR CONTROLLING TRANSIENT ENGINE RESPONSE

FIELD

Embodiments of the subject matter disclosed herein relate to controlling transient engine response in an internal combustion engine.

BACKGROUND

Many control approaches and schemes have been devised for internal combustion engines, particularly for large, relatively powerful diesel engines and engines running on other fuels. During periods of acceleration, a vehicle operator may command higher speed and/or torque from the vehicle, requiring higher output from the engine. In the case of rail vehicles and other transport vehicles, when steeper grades are encountered, additional torque or tractive effort is needed to maintain the speed of the vehicle, thereby increasing the power output demanded of the engine. As a result, during such a transient conditions, a greater amount of fuel may be injected to the engine; however, the fuel increase may not be immediately matched by a proportionate increase in air supplied to the engine. This may result in an air-fuel ratio that is too rich, leading to a decrease in engine speed, inefficient engine operation, and/or an increase in engine emissions.

In one approach, an engine system includes an air storage tank that delivers additional air to an intake manifold of the engine during transient conditions. As such, the cylinders of the engine may receive a greater air charge, resulting in a greater air-fuel ratio and faster torque increase. In such an example, however, there is a delay between a time a need for the additional air is determined and the time when the additional air is received by the cylinders due to, for example, a time it takes to fill the manifold with the additional air. As such, the cylinders may not receive the additional air for several engine strokes after the storage tank begins delivering the additional air to the intake manifold, thus delaying the response of the engine.

BRIEF DESCRIPTION

In one embodiment, a method for operating an internal combustion engine includes, under a first condition, charging a compressed air storage vessel via a compressor. The method further includes, under a second condition, directly injecting compressed air from the storage vessel to a cylinder of the engine to enhance fuel combustion. Further, under the second condition, timing of the direct injection of compressed air is based on valve timing of the cylinder and fuel injection timing of the cylinder.

By injecting the compressed air to an engine cylinder under conditions, such as transient conditions when engine load is increased, a more proportionate increase in air supplied to the engine may result and an air-fuel ratio may at least be maintained, for example. Further, by injecting the compressed air directly to cylinders of the engine, a time for the engine to respond to the changing conditions may be decreased. For example, the compressed air may be injected to the first cylinder in which the intake valve closes after it is determined that there is a need for additional air (e.g., during an immediately subsequent engine stroke). As such, the cylinders of the engine receive the compressed air in a reduced amount of time, thereby improving the transient response of the engine.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

DETAILED DESCRIPTION

The following description relates to various method and systems for controlling transient engine response. In one example embodiment, a method for operating an internal combustion engine includes, under a first condition, charging a compressed air storage vessel via a compressor. The method further includes, under a second condition, directly injecting compressed air from the storage vessel to a cylinder of the engine to enhance fuel combustion. Under a third condition, the method includes ceasing the injection of compressed air from the storage vessel. In such a configuration, as will be described in detail below, the response of the engine during transient conditions may be improved. For example, because the compressed air is directly injected to the cylinder from the storage vessel, a time for the cylinder to receive the air is relatively short resulting in a fast engine response and less time in which an air-fuel ratio of the engine may decrease below a threshold air-fuel ratio.

Figure 1:
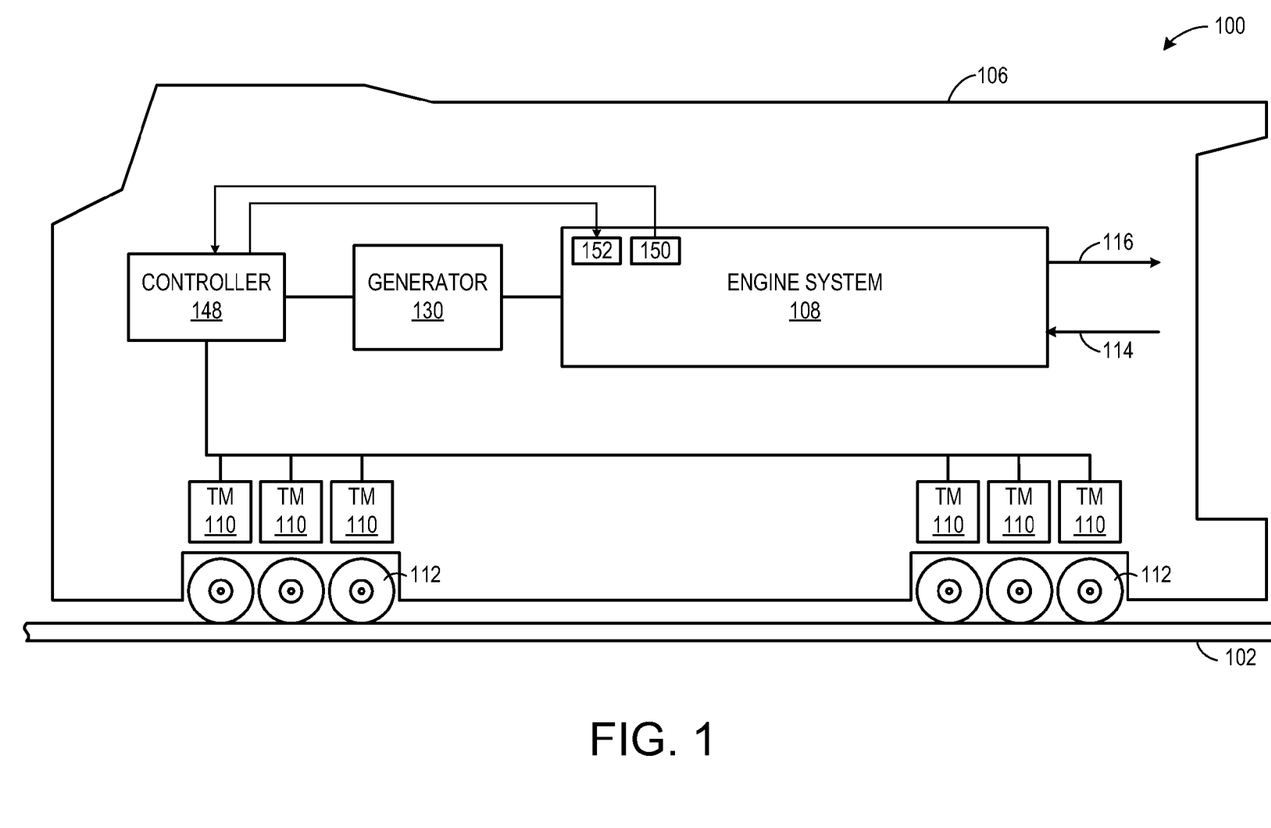
FIG. 1 shows a schematic diagram of an example embodiment of a rail vehicle with an engine system according to an embodiment of the invention.

In some embodiments, the method may be configured for an engine in a vehicle, such as a rail vehicle. For example, FIG. 1 shows a block diagram of an example embodiment of a vehicle system 100 (e.g., a locomotive system), herein depicted as a rail vehicle 106, configured to run on a rail 102 via a plurality of wheels 112. As depicted, the rail vehicle 106 includes an engine system 108 with an engine (shown in FIG. 2). In other non-limiting embodiments, the engine system 108 may be a stationary engine system, such as in a power-plant application, or an engine system in a ship or off-highway vehicle propulsion system.

In one example, the rail vehicle 106 is a diesel-electric vehicle. For example, the engine system 108 includes a diesel engine that generates a torque output that is transmitted to the generator 130. The generator 130 produces electrical power that may be stored and applied for subsequent propagation to a variety of downstream electrical components. For example, the generator 130 may provide electrical power to a plurality of traction motors 110. As depicted, the plurality of traction motors 110 are each connected to one of a plurality of wheels 112 to provide tractive power to propel the rail vehicle 106. One example rail vehicle configuration includes one traction motor per wheel. As depicted herein, six pairs of traction motors correspond to each of six pairs of wheels of the rail vehicle.

The vehicle system 100 may further include an exhaust gas treatment system (not shown) coupled in the exhaust passage to reduce regulated emissions. In one example embodiment, the exhaust gas treatment system may include a diesel oxidation catalyst (DOC) and a diesel particulate filter (DPF), where the DOC is positioned upstream of the DPF in the exhaust gas treatment device. In other embodiments, the exhaust gas treatment system may be include a selective catalytic reduction (SCR) catalyst, three-way catalyst, $NO_x$ trap, various other emission control devices or combinations thereof.

In some embodiments, the vehicle system 100 may further include an exhaust gas recirculation (EGR) system, which routes exhaust gas from the exhaust passage 116 to the intake passage. By introducing exhaust gas to the engine, the amount of available oxygen for combustion is decreased, thereby reducing the combustion flame temperatures and reducing the formation of nitrogen oxides (e.g., $NO_x$).

As depicted in FIG. 1, the rail vehicle 106 further includes a controller 148 to control various components related to the vehicle system 100. In one example, the controller 148 includes a computer control system. The controller 148 additionally or alternatively includes non-transient computer readable storage media (not shown) including code for enabling on-board monitoring and control of rail vehicle operation. The controller 148, while overseeing control and management of the vehicle system 100, may be configured to receive signals from a variety of engine sensors 150, as further elaborated herein, in order to determine operating parameters and operating conditions, and correspondingly adjust various engine actuators 152 to control operation of the rail vehicle 106. For example, the controller 148 may receive signals from various engine sensors 150 including, but not limited to, engine speed, engine load, intake manifold air pressure, boost pressure, exhaust pressure, ambient pressure, exhaust temperature, etc. Correspondingly, the controller 148 may control the vehicle system 100 by sending commands to various components such as traction motors, alternator, cylinder valves, throttle, etc.

In one example, the controller 148 may send a signal to one or more injectors to inject compressed air from a compressed air storage vessel into one or more cylinders of the engine based on communication from engine sensors within the engine system indicating engine speed and/or load. Such an example will be described in greater detail below with reference to FIGS. 4-8.

Figures 2, 3:
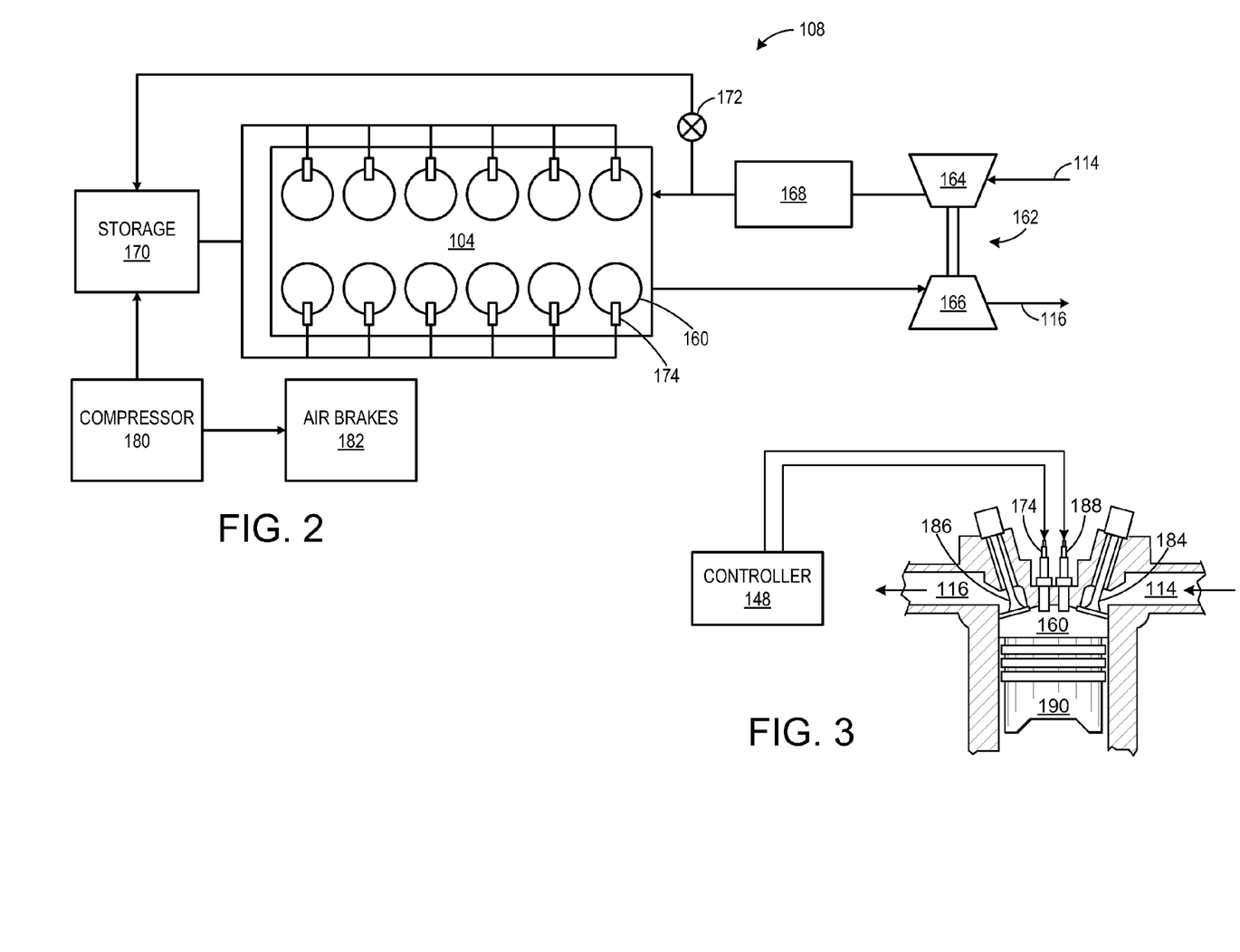
FIG. 2 shows a schematic diagram of an example embodiment of an engine system according to an embodiment of the invention.
FIG. 3 shows a somewhat schematic diagram of a cylinder of an engine according to an embodiment of the invention.

Continuing to FIG. 2, it shows an example embodiment of the engine system 108 depicted in FIG. 1 which includes an engine 104. As depicted, the engine 104 receives intake air for combustion from an intake conduit 114. The intake conduit 114 receives ambient air from an air filter (not shown) that filters air from outside of the rail vehicle 106. Exhaust gas resulting from combustion in the engine 104 is supplied to an exhaust passage 116. Exhaust gas flows through the exhaust passage 116, and out of an exhaust stack (not shown) of the rail vehicle 106. In one example, the engine 104 is a diesel engine that combusts air and diesel fuel through compression ignition. In other non-limiting embodiments, the engine 104 may combust fuel including gasoline, kerosene, biodiesel, or other petroleum distillates of similar density through compression ignition (and/or spark ignition). Further, in the example embodiment shown in FIG. 2, the engine 104 is a V-12 engine which has twelve cylinders 160. In other embodiments, the engine may be a V-6, V-16, I-4, I-6, I-8, opposed 4, or another engine type.

The engine system 108 further includes a turbocharger 162 that is arranged between the intake conduit 114 and the exhaust passage 116. The turbocharger 162 increases air charge of ambient air drawn into the intake conduit 114 in order to provide greater charge density during combustion to increase power output and/or engine-operating efficiency. The turbocharger 162 includes a compressor 164 (e.g., a turbo-driven compressor) that is at least partially driven by a turbine 166 which is mechanically coupled to the compressor 164. Intake air flows through the turbo-driven compressor 164 where it is compressed before entering the cylinders 160 of the engine 104. In the example embodiment of FIG. 2, the engine system 108 further includes a charge air cooler 168 which cools the compressed intake air before it enters the cylinder 160 of the engine 104. While in this case a single turbocharger is included, the system may include multiple turbine and/or compressor stages.

Further, the engine system 108 includes a compressed air storage vessel 170 (e.g., storage tank). The storage vessel 170 is of a sufficient volume to allow for the application of compressed air in relatively short transient periods in which power demands are made on the engine, for example. The particular volume and the pressure at which the storage vessel 170 operates may depend on the size and performance characteristics of the engine (e.g., fuel flow rates, air flow rates, inlet operating pressure, and the like).

As shown in FIG. 2, the storage vessel 170 is isolated from the intake conduit 114 by a valve 172. The valve 172 may be actuated (e.g., opened) by the controller to allow the storage vessel 170 to be selectively coupled to the output of the compressor 164 in order to charge (e.g., fill) the storage vessel 170 with compressed air. The valve 172 may be further actuated (e.g., closed) by the controller to isolate the storage vessel 170 from the compressor 164 once sufficient compressed air has been stored in the storage vessel 170.

Engine system 108 further includes a system compressor 180 for supplying compressed air to various components of the engine. System compressor 180 may be an electrically driven compressor that is driven by generator 130, for example. As shown in FIG. 2, the system compressor 180 is coupled to air brakes 182 which are coupled to the wheels 112 (not shown in FIG. 2) of the vehicle. In one example, the system compressor 180 may be coupled to an air brake system to supply compressed air for wheel brake actuation. As depicted in FIG. 2, the system compressor 180 may further supply the compressed air storage vessel 170 with compressed air in order to charge the storage vessel 170.

Filling the storage vessel 170 with compressed air from the system compressor 180 may provide improved control over an amount of air supplied to the storage vessel 170 than filling the storage vessel 170 with air from the compressor 164 of the turbocharger 162. Further, the storage vessel may be filled in less time with the system compressor 180 than the compressor 164. In some embodiments, the engine system may not include valve 172 and the storage vessel 170 may be charged only by the system compressor 180. In other embodiments, the system compressor 180 may be used to build up the storage tank to a higher pressure than the compressor 164 of the turbocharger 162 can supply to the storage vessel 170.

Further, the system compressor 180 may be used to fill the compressed air storage vessel 170 when the compressor 164 is needed to supply air to the engine, for example.

Further, each of the plurality of cylinders 160 includes an injector 174 so that pressurized air from the storage vessel may be discharged directly to the cylinders 160 of the engine 104. In such a configuration, because the compressed air is delivered directly to the cylinders of the engine, a volume of compressed air may be quickly delivered to the engine in response to changing engine conditions, such as increased power demand. As such, a greater amount of fuel may be injected to the cylinders so that the power demand may be met in a reduced amount of time, thereby improving transient response of the engine.

The injector 174 is further illustrated in FIG. 3 which shows a non-limiting example of one of the cylinders 160 of the engine 104 with a piston 190 positioned therein. The cylinder 160 is shown including at least one intake poppet valve 184 and at least one exhaust poppet valve 186 located in an upper region of cylinder 108. In some embodiments, each cylinder of the engine 104 may include at least two intake poppet valves and at least two exhaust poppet valves located at the cylinder head.

The cylinder further includes an air injector 174 and a fuel injector 188 located in an upper region of the cylinder. The air injector 174 and the fuel injector 188 are shown coupled directly to cylinder 160 for injecting air and fuel, respectively, directly therein in proportion to the pulse width of respective signals received from the controller 148. For example, a larger pulse width may deliver more compressed air to the cylinder than a shorter pulse width. In some embodiments, the air injector 174 and the fuel injector 188 may be solenoid-actuated pintle valves. It should be understood the air injector 174 may be coupled to the cylinder in any suitable location such that compressed air is delivered directly to the cylinder from the compressed air storage vessel. Further, the air injector 174 may be any suitable injector for delivering compressed air to the cylinder.

Figure 4:
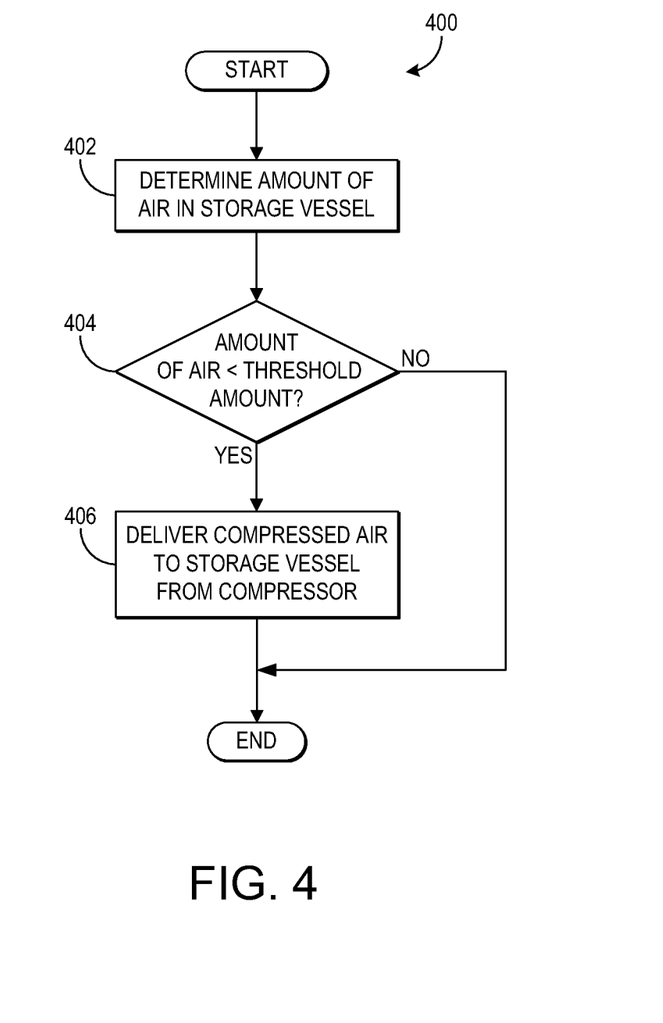
FIGS. 4 and 5 show flow charts illustrating methods for charging a compressed air storage vessel.

FIG. 4 shows a flow chart illustrating a method 400 for charging a compressed air storage vessel with a compressor, such as system compressor 180 described above with reference to FIG. 2. Specifically, the method 400 supplies compressed air to the storage vessel from the compressor based on an amount of air in the storage vessel.

At 402 of method 400, an amount of air in the storage vessel is determined. In some embodiments, the amount of air may be indicated by a pressure sensor disposed in the storage vessel. In other embodiments, the amount of air in the storage vessel may be determined by another suitable method.

At 404 of method 400, it is determined if the amount of air in the storage vessel is greater than a threshold amount. The threshold amount may be a maximum capacity (e.g., maximum pressure) of the storage vessel or slightly below the maximum capacity of the storage vessel, for example. If it is determined that the amount of air in the storage vessel is greater than the threshold amount, method 400 ends. On the other hand, if it is determined that the amount of air in the storage vessel is less than the threshold amount, method 400 continues to 406 where compressed air is delivered to the storage tank from the compressor.

Thus, the storage vessel may be charged by a compressor, such as a compressor that supplied compressed air to other systems such as brakes, suspension, or the like, based on a current amount of air in the storage vessel.

Figure 5:
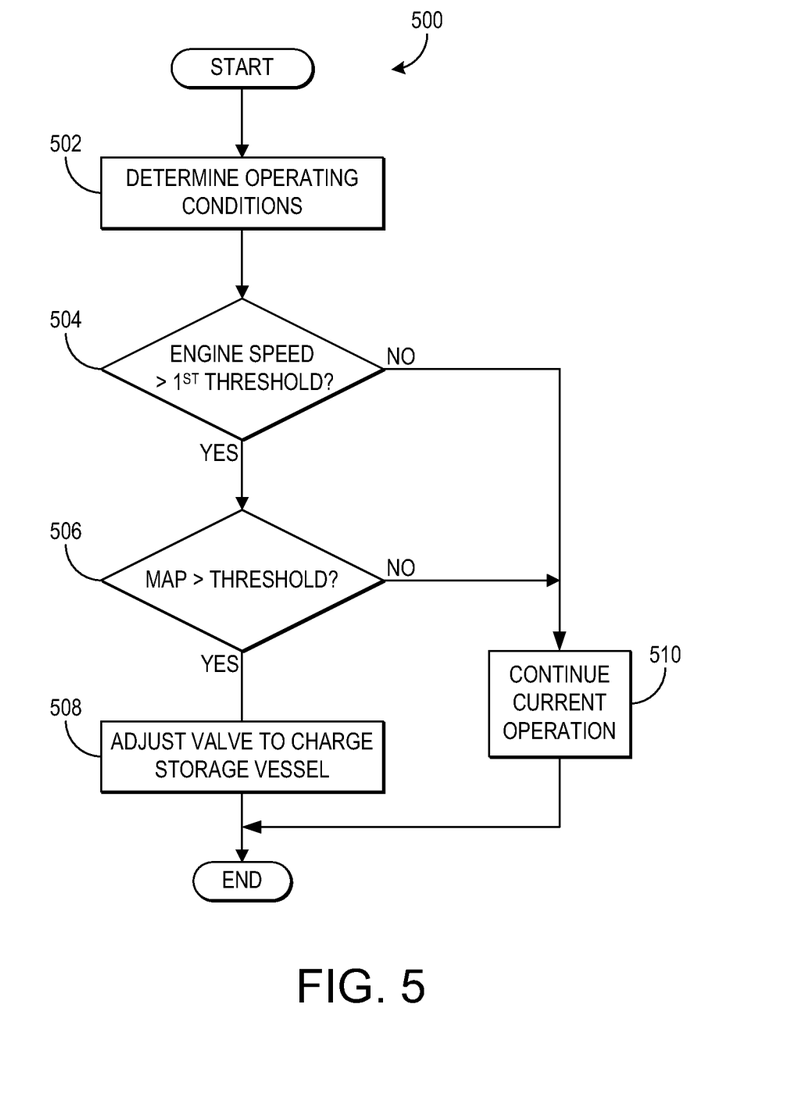

FIG. 5 shows a flow chart illustrating another method 500 for charging a compressed air storage vessel with a turbo-driven compressor, such as compressor 164 of turbocharger 162 described above with reference to FIG. 2. Specifically, the method 500 determines if current operating conditions allow for compressed air from the compressor of the turbocharger to be directed to the storage vessel thereby decreasing an amount of air available for combustion.

At 502 of method 500, engine operating conditions are determined. As non-limiting examples, engine operating conditions may include engine speed, engine load, manifold air pressure, and the like.

Once the operating conditions are determined, method 500 continues to 504 where it is determined if the engine speed is greater than a first threshold speed. Engine speed may be determined by conventional sensing systems, such as sensing by an engine speed sensor, for example. In one embodiment, the first threshold speed may be a desired speed for the current operating conditions. For example, the threshold speed may be high enough so that it does not need to increase resulting in an increased demand for air in the cylinders of the engine. If it is determined that the engine speed is less than the first threshold speed, method 500 moves to 510 where current engine operation is continued and the method ends.

On the other hand, if it is determined that the engine speed is greater than the first threshold speed, method 500 proceeds to 506 where it is determined if the manifold air pressure is greater than a threshold air pressure. The threshold air pressure may correspond to a pressure of the full load intake manifold pressure (e.g., over approximately 3 bar), for example, such that an amount of air that flows to the storage vessel may be increased. If it is determined that the manifold air pressure is less than the threshold air pressure, method 500 moves to 510 where the current engine operation is continued and the method ends.

In contrast, if it is determined that the manifold air pressure is greater than the threshold air pressure, method 500 continues to 508 where a valve, such as valve 172 described above with reference to FIG. 2, is adjusted (e.g., opened) to allow a flow of compressed air to enter the storage vessel. As noted above, this can be done by sending an appropriate control signal to the valve actuator which is shifted to allow flow of air from the compressor to the storage vessel. Once it is determined that the storage vessel contains a sufficient amount of air, the valve is closed. As an example, the amount of air may be indicated by a pressure sensor disposed in the storage vessel.

Thus, the storage vessel may be charged by the compressor of the turbocharger under operating conditions such as full load operation of the engine when a pressure in the intake manifold is relatively high.

Figure 6:
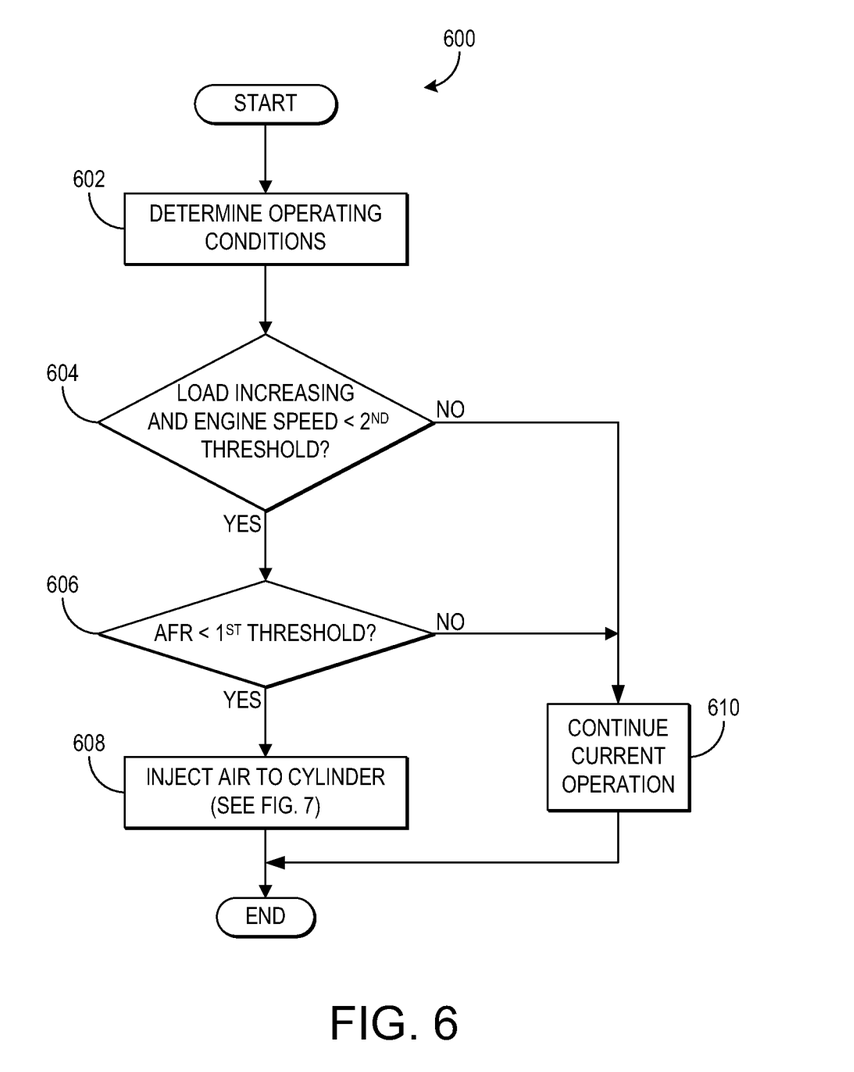
FIG. 6 shows a flow chart illustrating a method for determining if injection of compressed air from a compressed air storage vessel is desired.

FIG. 6 shows a flow chart illustrating a method 600 for determining if compressed air should be delivered to cylinders of the engine. Specifically, the method 600 determines if injection of compressed air to the engine is desired based on current operating conditions. For example, when an increased load is placed on the engine, the controller may increase the fueling rate to enable the engine to generate more power to meet the increased load demands. In order to maintain an air-fuel ratio above a desired air-fuel ratio, an increased amount of air delivered to the cylinders of the engine may be desired to match the increase fuel rate.

At 602 of method 600, engine operating conditions are determined. As noted above, engine operating conditions may include engine speed, engine load, and the like.

Once engine operating conditions are determined, method 600 continues to 604 where it is determined if engine load is increasing and if the engine speed is less than a second threshold speed. As non-limiting examples, the increased load may result from manual or automated throttling of the engine, or from environmental conditions, such as an incline encountered by the vehicle. Such load parameters may be detected in accordance with any suitable conventionally known technique. If it is determined that the engine load is not increasing and/or the engine speed is greater than the second threshold speed, method 600 moves to 610 where the current engine operation is continued and the method ends.

On the other hand, if it is determined that the engine load is increasing and the engine speed is less than the second threshold speed, method 600 proceeds to 606 where is it determined if the air-fuel ratio is less than a first threshold air-fuel ratio. For example, the first threshold air-fuel ratio may be close to a minimum air-fuel ratio for engine operating efficiency, fuel economy, emissions reduction, or the like. If it is determined the air-fuel ratio is greater than the first threshold air-fuel ratio, method 600 moves to 610 where the current engine operation is continued and the method ends.

In contrast, if it is determined that the air-fuel ratio is less than the first threshold, method 600 continues to 608 where compressed air is injected directly from the storage vessel to one or more cylinders of the engine, as will be described in detail with reference to FIG. 7.

Thus, during transient conditions (e.g., when power output demands have increased), injection of air to the engine may be desired in order to at least maintain the air-fuel ratio above a threshold air-fuel ratio so that fuel combustion may be enhanced in response to the changing engine conditions.

Figure 7:
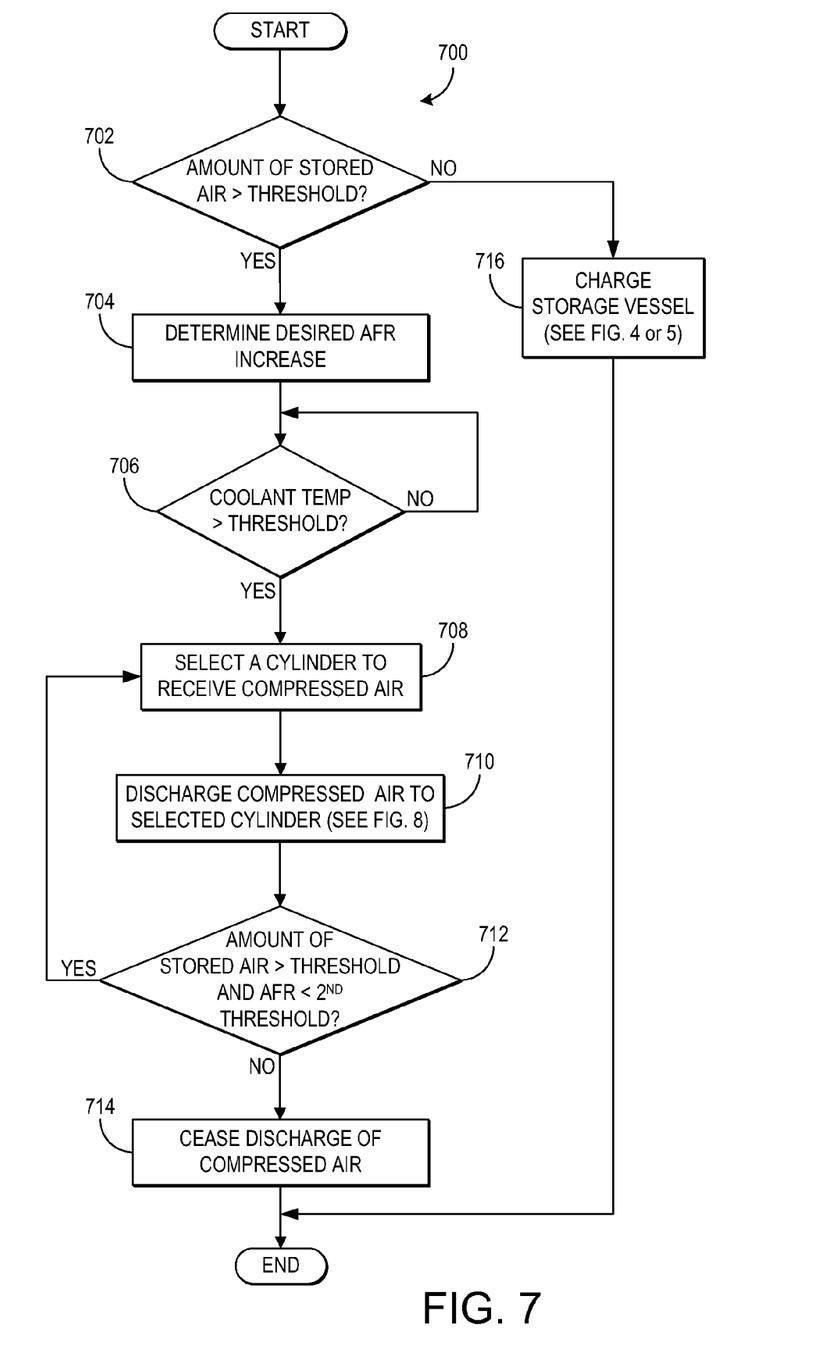
FIG. 7 shows a flow chart illustrating a method for discharging compressed air to cylinders of the engine.

FIG. 7 shows a flow chart illustrating a method 700 for discharging air from the storage vessel to the cylinders of the engine. Specifically, method 700 controls injection of compressed air from the storage vessel to the cylinders of the engine based on conditions such as an amount of stored compressed air and a desired increase in air-fuel ratio.

At 702 of method 700, it is determined if the amount of stored air in the storage vessel is greater than a threshold amount. The amount of compressed air may be determined based on a pressure indicated by a pressure sensor disposed in the storage vessel, for example. If it is determined that the amount of stored compressed air is less than the threshold amount, method 700 moves to 716 where the storage vessel is charged with air, such as via method 400 or 500 described above with reference to FIGS. 4 and 5. Charging of the storage vessel may not occur until the appropriate operating condition for charging the storage vessel, such as manifold air pressure greater than a threshold pressure, are reached, for example.

On the other hand, if it is determined that the amount of stored compressed air is greater than a threshold amount, method 700 continues to 704 where a desired air-fuel ratio increase is determined. As an example, the desired increase in air-fuel ratio may be a difference between the current air-fuel ratio and an air-fuel ratio for efficient engine operation at the desired power output of the engine.

At 706 of method 700 it is determined if the coolant temperature is greater than a threshold temperature. During a cold start, for example, before the coolant temperature is up to a normal operating temperature (e.g., warmed-up operating temperature), the engine may only produce a limited amount of power in order to reduce degradation of various components of the engine. As such, the controller may not significantly increase fuel injection until after the coolant temperature reaches its warmed-up operating temperature.

If it is determined that the coolant temperature is greater than the threshold temperature, or once the coolant temperature exceeds the threshold temperature, method 700 proceeds to 708 where a cylinder is selected to receive compressed air. Selection of the first cylinder to receive the compressed air from the storage vessel may be based on cylinder firing order and current crankshaft position and camshaft timing. For example, air may be injected to the cylinder after intake valve closing and before fuel injection. As such, the compressed air from the storage vessel may be delivered to the next cylinder in which the intake valve closes, which may occur during the immediately subsequent engine stroke after it is determined that additional air is desired for combustion. In this manner, fuel combustion in the cylinder may be enhanced such that the engine responds to the change in load in a reduced amount of time, as compared to a scenario without additional air discharged to the engine or a scenario in which the additional air is directed to the intake manifold.

In some examples, more than one cylinder may be selected to receive compressed air over the next engine cycle (which as used herein refers to two crankshaft revolutions of the engine for a 4-stroke engine, and one crankshaft revolution of the engine for a 2-stroke engine). In other examples, in response to the changing engine conditions, direct injection of the compressed air may be carried out in every cylinder of the engine for a predetermined number of engine cycles. Further, an amount of compressed air delivered to each cylinder may be the same. In other examples, the cylinders may receive different amounts of compressed air based on operating parameters such as if the cylinder is an EGR donor cylinder, fuel injection timing and amount in each cylinder, etc.

Further, an amount of air delivered to the cylinders may vary based on operating conditions. As one example, when a small increase in air-fuel ratio and/or torque output is desired, a small amount of air is injected to the cylinders. As another example, when a small increase in air-fuel ratio and/or torque output is desired at a relatively higher engine speed, a greater amount of compressed air may be injected less times. As yet another example, when a large increase in air-fuel ratio and/or torque output is desired, a greater amount of compressed air may be delivered a greater number of times. Further, as the air-fuel ratio and/or torque output increases, the amount of additional air injected to each of cylinders may decrease over time, for example.

Figure 8:
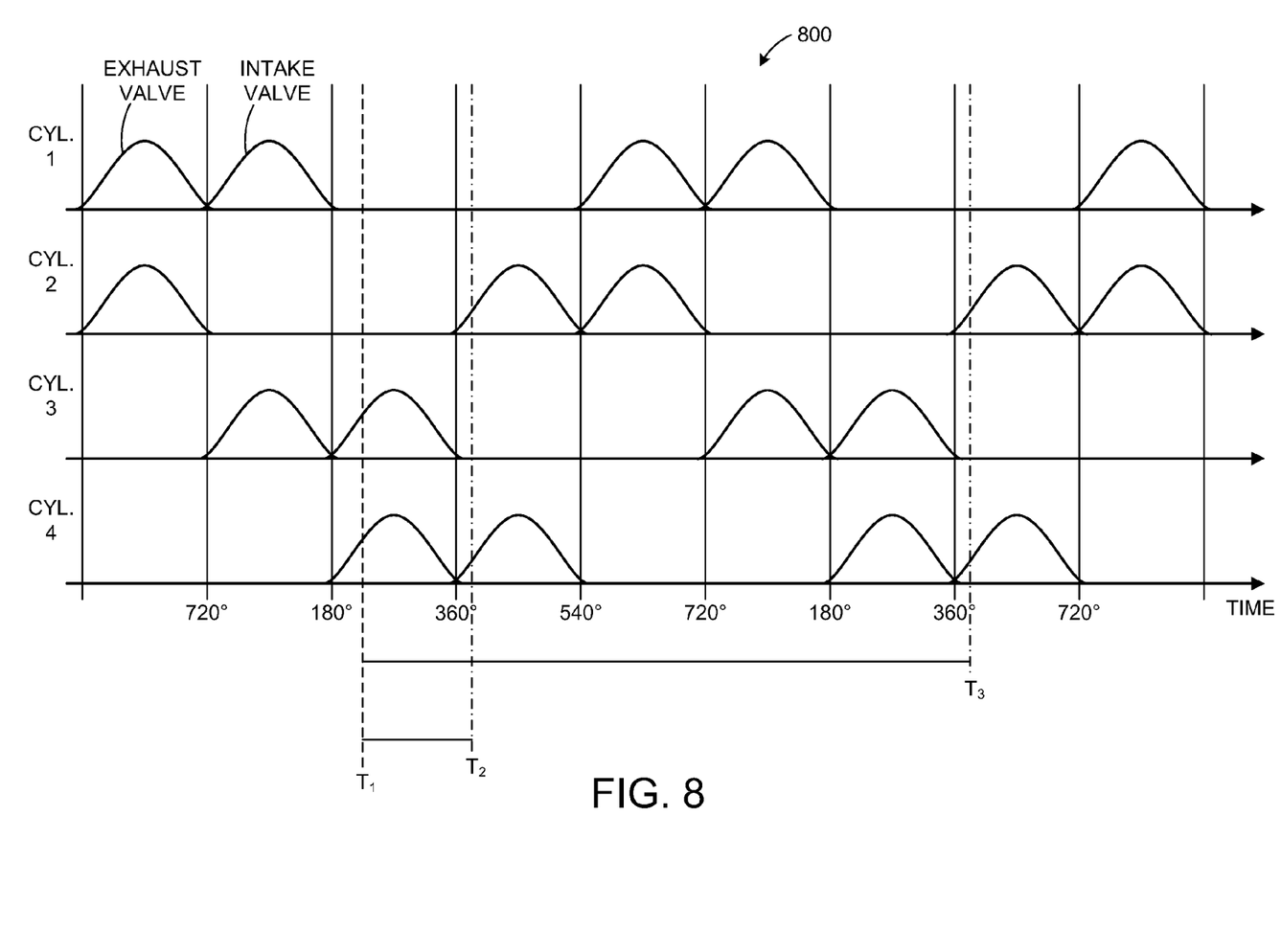
FIG. 8 shows a timing chart illustrating injection of compressed air according to an embodiment of the invention.

FIG. 8 shows a non-limiting example of a timing chart 800 illustrating discharge of compressed air to a 4 cylinder engine. In the 4 cylinder engine, a single engine cycle occurs over 720 degrees of crankshaft rotation. Further, as an example, the cylinder may have a firing order of cylinder 1, cylinder 3, cylinder 4, and cylinder 4 (e.g., 1-3-4-2). Although the example is described for a 4 cylinder engine, it should be understood, the method may be applied to an engine with another number of cylinders such as 10 cylinder engine, a 12 cylinder engine, a 14 cylinder engine, or a 16 cylinder engine.

At time $T_1$, at which the crankshaft has rotated to a position of ~210 degrees, the controller may determine that additional air is needed due to an increase in engine load, for example. In the example of FIG. 8, time $T_1$ occurs during the compression stroke of cylinder 1, the power stroke of cylinder 2, the intake stroke of cylinder 3, and the exhaust stroke of cylinder 4. In an embodiment in which compressed air is delivered from a storage vessel directly to the cylinders of the engine, the additional air may be injected after the intake valve of any cylinder closes. In the example of FIG. 8, the intake air is injected at time $T_2$ during the intake stroke of cylinder 3, when the crankshaft has rotated to a position of ~380 degrees during the same engine cycle. In an embodiment in which compressed air is discharged from the storage vessel to the intake manifold, the engine may not receive the additional air for several strokes. For example, FIG. 8 shows the additional air is delivered at time $T_3$ during an intake stroke of cylinder 4, when the crankshaft has rotated to a position of ~380 degrees during the subsequent engine cycle. Thus, by injecting the stored compressed air directly to cylinders of the engine, the engine may respond quickly during transient conditions when increased torque is desired.

Continuing with FIG. 7, at 712 of method 700, it is determined if the amount of stored air in the storage vessel is greater than a threshold amount and if the air-fuel ratio is less than a second threshold air-fuel ratio after discharge of compressed air into one or more cylinders. The second threshold air-fuel ratio may be the desired air-fuel ratio for increased engine efficiency during transient conditions, for example. As used herein, the terms "first" and "second" are used merely as labels to describe the threshold air-fuel ratio and do not imply that there must be two considerations of different threshold air-fuel ratios. For example, the first threshold air-fuel ratio may be considered by itself, the second threshold air-fuel ratio may be considered by itself, or both the first and second threshold air-fuel ratios may be considered, each in its own relevant context.

If it is determined that the amount of stored air is greater than the threshold amount and the air-fuel ratio is less than the second air-fuel ratio, method 700 returns to 708 where a cylinder is selected to receive compressed air from the storage vessel. As discussed above, an amount of air injected into the cylinder(s) may based on various parameters such as amount of air in the storage vessel, desired air-fuel ratio and time before fuel is injected to the cylinder. In some examples, fuel injection may be retarded in order to increase the time in which additional air may be injected to the cylinder, thereby increasing the amount of additional air injected to the cylinder (s). After compressed air is discharged to the cylinder(s) at 710, method 700 returns to 712 to determine if compressed air should be discharged to another cylinder.

If it is determined that the amount of stored compressed air is less than the threshold and the air-fuel ratio is less than the second threshold air-fuel ratio, method 700 moves to 714 where the discharge of compressed air to the engine ceases and the method ends.

Thus, compressed air may be directly injected from the storage vessel to one or more cylinders of the engine based on various operating conditions. Selection of the first cylinder to which the compressed air is delivered may be based on cylinder valve timing and fuel injection timing of each of the plurality of engine cylinders at a current crank angle or crank angle range. As one example, assuming a decision is made to inject the compressed air directly to an engine cylinder, a particular cylinder in the firing order is then selected that is the earliest cylinder in which the air can be delivered and used for combustion to increase the air-fuel ratio. Specifically, as indicated above, an example method may map a particular crankshaft (or camshaft) angle to a particular cylinder to be selected as the first cylinder in which to commence the direct injection of air. In this case, the mapping may be based on the firing order, intake valve closing timing, fuel injection timing, among others. In an example where the condition is identified where injection of air is requested, the method may inject air to a cylinder currently in the compression stroke, but sufficiently before fuel injection such that the desired amount of air can be injected, as the first cylinder to receive injected air. However, if said cylinder is too far along in the compression stroke, the next immediate cylinder in the firing order (which may not be physically adjacent) may be selected as the first cylinder to receive injected air.

Further, because the compressed air is discharged directly to the cylinders of the engine, a cylinder may receive the compressed air during an immediately subsequent engine stroke. In this manner, the engine may quickly respond and quickly output a desired power during transient engine conditions.

An embodiment relates to a method for operating an internal combustion engine, e.g., an internal combustion engine of a vehicle or of a stationary engine system, such as in a generator. The method includes, under a first condition, charging a compressed air storage vessel via a compressor. (The compressed air storage vessel may be on-board the vehicle.) The method additionally includes, under a second condition, directly injecting compressed air from the storage vessel to a cylinder of the engine to enhance fuel combustion.

In another embodiment of the method, the method further includes timing the direct injection based on valve timing of the cylinder and fuel injection timing of the cylinder. That is, the step of directly injecting the compressed air is timed based on valve timing of the cylinder and fuel injection timing of the cylinder. The compressor is a turbo-driven compressor, and the first condition includes engine speed above a first threshold speed and intake manifold pressure greater than a threshold pressure.

In another embodiment of the method, under the second condition, timing the direct injection based on valve timing includes directly injecting the compressed air after closing of an intake valve of the cylinder. That is, the step of directly injecting the compressed air is timed in relation to closing of the intake valve of the cylinder, such that the compressed air is directly injected after the intake valve closes. (In an aspect, compressed air is directly injected after the intake valve closes and before the intake valve is next opened.) Timing the direct injection based on fuel injection timing includes directly injecting the compressed air before fuel injection to the cylinder (e.g., air is directly injected into the cylinder before the next injection of fuel into the cylinder after the intake valve closes). In one embodiment, air is directly injected into a cylinder after an intake valve of the cylinder is closed, before the intake valve is next opened, and before the immediately next time fuel is injected into the cylinder after the intake valve is closed.

Another embodiment relates to a method for operating an internal combustion engine, e.g., an engine of a vehicle or of a stationary engine system, such as in a generator. The method includes charging a compressed air storage vessel via a compressor. The method further includes discharging compressed air from the storage vessel directly to a cylinder of the engine to enhance fuel combustion in response to changes in an engine load during engine operation with engine speed below a first threshold speed to maintain an air-fuel ratio above a first threshold air-fuel ratio. In one embodiment, air is discharged from the storage vessel directly to a cylinder of the engine when: the engine is operating; there is a change in engine load; and the engine speed is below a first threshold speed; and for purposes of enhancing fuel combustion, by maintaining an air-fuel ratio above a first threshold air-fuel ratio.

Another embodiment relates to a system. The system comprises a controller configured to identify a changing engine condition of an engine, e.g., an engine of a vehicle or of a stationary engine system, such as in a generator. In response to the changing engine condition, the controller selects a first cylinder of the engine to receive a direct injection of compressed air from a compressed air storage vessel. Further, the controller generates control signals for controlling the direct injection of compressed air from the compressed air storage vessel, wherein the controller is configured to time generation of the control signals based on signals relating to cylinder valve timing and fuel injection timing of the first cylinder of the engine.

As explained above, terms such as "small increase" and "large increase" are relative, meaning that a "large" increase is an increase higher than a "small" increase. Conversely, a "small" increase is an increase lower than a "large" increase.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for operating an engine, comprising:
   charging a compressed air storage vessel via a compressor; and
   discharging compressed air from the compressed air storage vessel directly to a cylinder of the engine to enhance fuel combustion in response to changes in an engine load during engine operation with engine speed below a first threshold speed to maintain an air-fuel ratio above a first threshold air-fuel ratio, wherein discharging of the compressed air occurs after an intake valve of the cylinder has closed and before fuel is injected to the cylinder, and wherein the changes in engine load include an increase in engine load.

2. A method for operating an engine, comprising:
   charging a compressed air storage vessel via a compressor;
   discharging compressed air from the compressed air storage vessel directly into a plurality of cylinders of the engine via a respective plurality of air injectors each coupled to a head of the cylinders to enhance fuel combustion in response to changes in an engine load during engine operation with engine speed below a first threshold speed to maintain an air-fuel ratio above a first threshold air-fuel ratio, and
   decreasing an additional amount of compressed air injected to each of the plurality of cylinders as the air-fuel ratio increases.

3. The method of claim 2, wherein the compressor is a system compressor which is electrically-driven and the system compressor is coupled to an air brake system.

4. The method of claim 2, further comprising selecting a cylinder, from among the plurality of cylinders, to which compressed air is directly delivered based on cylinder firing order and current crankshaft position and camshaft timing of the engine.

5. A method for operating an engine, comprising:
   under a first condition, charging a compressed air storage vessel via an electrically-driven compressor;
   under a second condition, responsive to an air-fuel ratio being less than a first threshold air-fuel ratio, directly injecting compressed air from the compressed air storage vessel to a cylinder of the engine via an air injector coupled to a head of the cylinder to enhance fuel combustion; and
   under a third condition, ceasing the injection of compressed air to the cylinder from the compressed air storage vessel when the air-fuel ratio is greater than a second threshold air-fuel ratio.

6. The method of claim 5, further comprising timing the direct injection based on valve timing of the cylinder and fuel injection timing of the cylinder, and wherein the first condition includes an engine speed of the engine above a first threshold speed and an intake manifold pressure greater than a threshold pressure.

7. The method of claim 6, wherein under the second condition, timing the direct injection based on valve timing includes directly injecting the compressed air after closing of an intake valve of the cylinder, and timing the direct injection based on fuel injection timing includes directly injecting the compressed air before fuel injection to the cylinder.

8. The method of claim 7, wherein the second condition further includes the engine speed being less than a second threshold speed.

9. The method of claim 8, wherein the third condition further includes an amount of air in the compressed air storage vessel being less than a threshold amount.

10. The method of claim 7, further comprising retarding injection timing to increase an amount of compressed air injected to the cylinder.

11. The method of claim 6, wherein the second condition includes a coolant temperature of coolant of the engine or cylinder greater than a threshold temperature, and wherein the compressor is coupled to an air brake system to supply compressed air for wheel brake actuation.

12. The method of claim 5, wherein under the second condition, each cylinder of the engine is injected with a same amount of air during a single engine cycle.

13. The method of claim 5, wherein under the second condition, each cylinder of the engine is injected with a different amount of air during a single engine cycle.

14. A method for operating an engine, comprising:
   charging a compressed air storage vessel via a compressor; and
   discharging compressed air from the compressed air storage vessel directly to a cylinder of the engine to enhance fuel combustion in response to changes in an engine load during engine operation with engine speed below a first threshold speed to maintain an air-fuel ratio above a first threshold air-fuel ratio, wherein the compressor is a turbo-driven compressor positioned in an intake manifold of the engine, and wherein charging the compressed air storage vessel includes adjusting a valve to direct compressed air from the turbo-driven compressor to the compressed air storage vessel when an intake manifold pressure is greater than a threshold pressure and engine speed is greater than the first threshold speed.

15. A system for an engine, comprising:
   a compressed air storage vessel; and a controller configured to execute computer code stored in non-transitory computer-readable media to:
  identify a changing engine condition, and, in response to the changing engine condition, select a first cylinder of the engine to receive a direct injection of compressed air from the compressed air storage vessel, and time the direct injection of compressed air from the compressed air storage vessel to the first cylinder of the engine based on cylinder valve timing and fuel injection timing of the first cylinder, wherein the changing engine condition includes increasing engine load with engine speed less than a threshold speed and air-fuel ratio less than a first threshold air-fuel ratio.

16. A system, comprising:
a controller configured to execute computer code stored in non-transitory computer-readable media to:
  identify a changing engine condition of an engine, and, in response to the changing engine condition, select a first cylinder of the engine to receive a direct injection of compressed air from a compressed air storage vessel via an air injector based on a firing order of the first cylinder relative to a firing order of a cylinder where the changing engine condition was identified, and to generate control signals for controlling the direct injection of compressed air from the compressed air storage vessel, wherein the controller is configured for time generation of the control signals based on signals relating to cylinder valve timing and fuel injection timing of the first cylinder of the engine.

17. A system for an engine, comprising:
a compressed air storage vessel receiving compressed air from a compressor coupled to an air brake system of the engine; and
a controller configured to execute computer code stored in non-transitory computer-readable media to:
  identify a changing engine condition, and, in response to the changing engine condition, select a first cylinder of the engine to receive a direct injection of compressed air from the compressed air storage vessel via an air injector coupled to an upper region of the first cylinder based on firing order, retard fuel injection timing of the first cylinder, and time the direct injection of compressed air from the compressed air storage vessel to the first cylinder of the engine based on cylinder valve timing and fuel injection timing of the first cylinder so as to inject fuel after intake valve closing and before fuel injection in the first cylinder, the first cylinder selected to be a next cylinder in which an intake valve closes relative to a cylinder during whose firing the changing engine condition was identified.

18. The system of claim 17, wherein in response to the changing engine conditions, direct injection of the compressed air is carried out in every cylinder of the engine for a predetermined number of engine cycles.

19. A system for an engine, comprising:
a compressed air storage vessel; and
a controller configured to execute computer code stored in non-transitory computer-readable media to:
  identify a changing engine condition, and, in response to the changing engine condition,
  select a first cylinder of the engine to receive a direct injection of compressed air from the compressed air storage vessel,
  retard fuel injection timing of the first cylinder;
  time the direct injection of compressed air from the compressed air storage vessel to the first cylinder of the engine based on cylinder valve timing and fuel injection timing of the first cylinder,
  decrease an additional amount of compressed air injected to the first cylinder as the air-fuel ratio increases; and
  cease direct injection of compressed air when at least one of an amount of air in the compressed air storage vessel is less than a threshold amount and an air-fuel ratio is greater than a threshold air-fuel ratio.

20. The system of claim 17, wherein the engine is positioned in a rail vehicle.

* * * * *

UNITED STATES PATENT AND TRADEMARK OFFICE
CERTIFICATE OF CORRECTION

| | | |
|---|---|---|
| PATENT NO. | : 8,567,191 B2 | Page 1 of 1 |
| APPLICATION NO. | : 13/072057 | |
| DATED | : October 29, 2013 | |
| INVENTOR(S) | : Geyer | |

It is certified that error appears in the above-identified patent and that said Letters Patent is hereby corrected as shown below:

In the Specification

In Column 5, Line 20, delete "cylinder 108." and insert -- cylinder 160. --, therefor.

Signed and Sealed this
Twenty-seventh Day of May, 2014

Michelle K. Lee
*Deputy Director of the United States Patent and Trademark Office*